March 28, 1939.  G. H. DOWTY  2,152,539
RETRACTABLE UNDERCARRIAGE FOR AIRCRAFT
Filed April 15, 1936  2 Sheets-Sheet 1
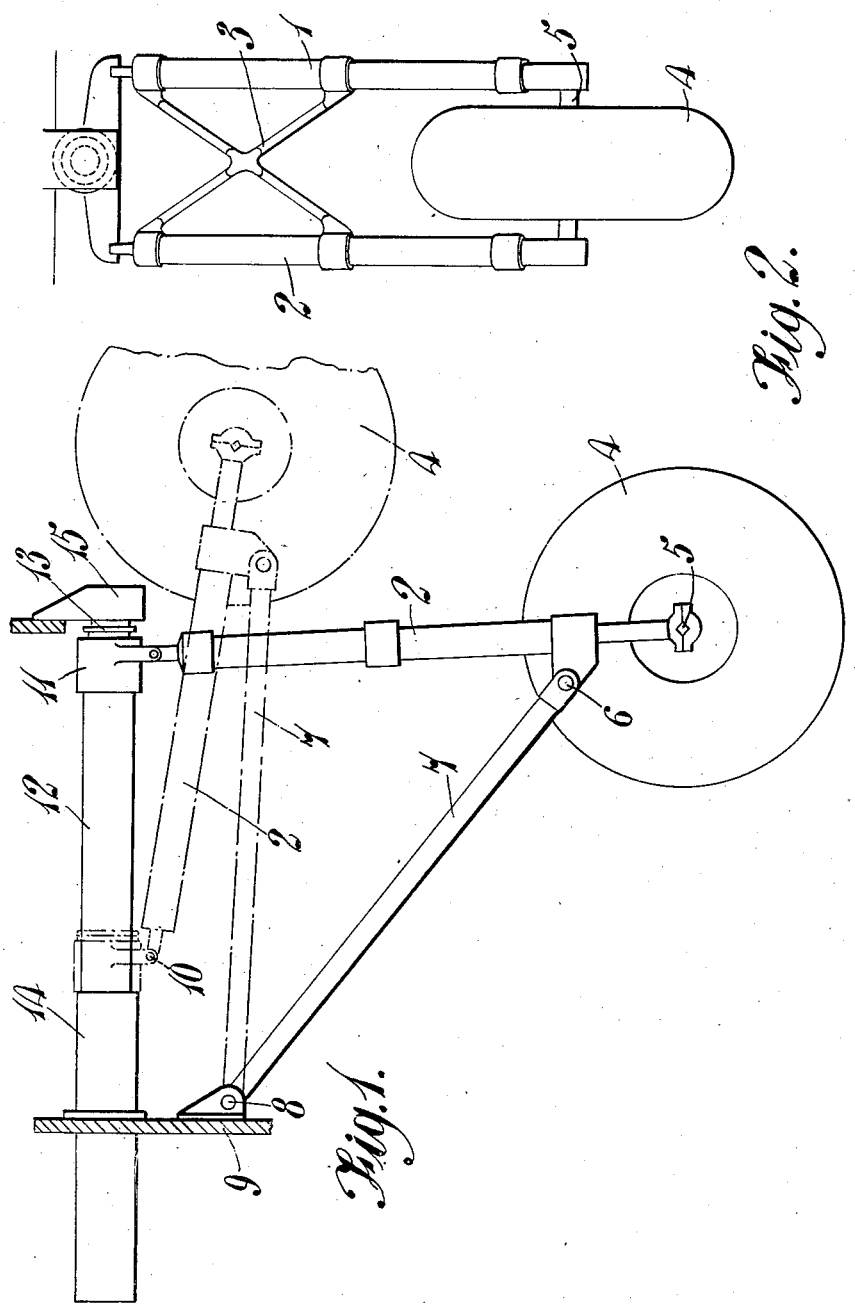
INVENTOR
G. H. Dowty.
By Lacey & Lacey,
Attys

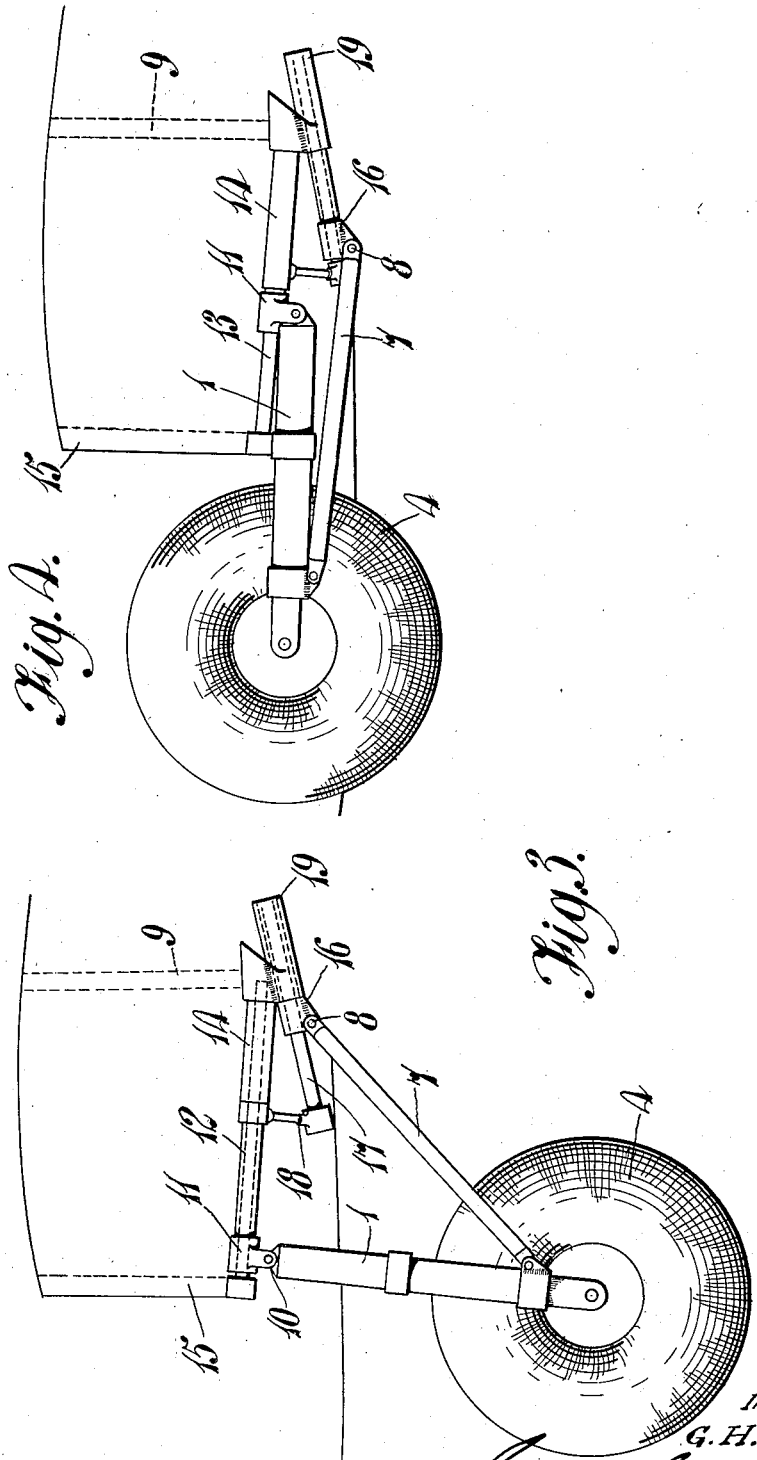

Patented Mar. 28, 1939

2,152,539

UNITED STATES PATENT OFFICE 2,152,539

RETRACTABLE UNDERCARRIAGE FOR AIRCRAFT

George Herbert Dowty, Cheltenham, England

Application April 15, 1936, Serial No. 74,604
In Great Britain April 23, 1935

14 Claims. (Cl. 244—102)

This invention relates to retractable undercarriages for aircraft and seeks to provide a construction or arrangement which may have advantages in meeting problems of installation in some cases. The invention is particularly applicable to undercarriages retracting in the fore-and-aft plane or direction. The invention may contribute to structural strength without unduly increasing weight, and it may be found especially useful where it is desired to afford what is known as forward retraction. The invention further seeks to provide a construction and layout and a manner of operation which may be found advantageous in meeting the requirements of certain designs of aircraft. It may also enable comparatively heavy undercarriages to be retracted with a certain degree of facility, and may have the further advantage that the position of the centre of gravity of the undercarriage may be substantially unchanged in the fore-and-aft direction relative to that occupied in the operative position of the undercarriage. A further advantage may reside in the possibility of using comparatively low operative pressures in a hydraulic retractable undercarriage without involving the use of large piston areas. It is found that in some cases the position of the wheel in the landing and retracted position is closely limited, and when the points of attachment of the undercarriage are also restricted it may not be possible to retract the undercarriage, unless resort is made to an action in which two or more of the undercarriage supporting points can be moved or repositioned during retraction: the invention may meet such cases, and other advantages, particularly in relation to structural strength, may become apparent when the following description has been read.

According to this invention broadly stated, a retractable aircraft undercarriage has leg and radius rod elements or equivalent elements, pivotally interattached and each pivotally attached or anchored at fittings one at least of which is slidably mounted, preferably forming virtually the moving part of a retraction jack so disposed that during retraction the points of anchorage approach one another. There is preferably provided a retractable aircraft undercarriage in which there are, substantially in the plane in which the movement of retraction is intended to take place, pivotally interconnected and pivotally anchored leg and radius rod or equivalent compression members forming virtually a triangular structure when extended, and also at least one jack (preferably hydraulic) with its moving part of fitting arranged to move in the said plane, and along a line which is substantially at right angles to the direction of compression load in one of said members when extended, this member being pivotally attached to the moving jack part. Both compression members may be pivotally attached to the two moving parts of two jacks, in such manner that the two pivotal attachments approach during retraction. The structure is preferably so arranged that retraction movement of the jack causes the wheel-carrying extremity of the leg to swing upwards and forwards. The jack to which the leg is pivotally attached is preferably of such a nature that it is in effect a beam supported at two or more spaced points and, as a beam, may form a structural part of the aircraft, e. g., a compression member between two main wing spars. Where two jacks are used they are preferably arranged to operate in what may be termed a differential manner; in such a case the moving anchorages may conveniently be arranged so that in retraction they approach one another along paths which, whilst controlling the path of retraction, bring the moving parts into a compact position, as will be seen more clearly in the example illustrated. If a plurality of separate jacks be used they are preferably hydraulic piston and cylinder jacks operated from a mutual source of pressure so that if one jack suffers some obstruction, the other may continue to operate, the pressure in the jacks of course remaining equal or proportional. Further, in a case of the plurality of jacks, whilst one jack is arranged so that its operative line is at right angles to one of the compression elements, the other may either be likewise arranged or, may be so arranged that compression loads in its associated compression member act, in the extended condition, practically straight against a limiting abutment, whereby undesirable loads may be avoided and positive supporting of the undercarriage in the extended position may be ensured.

The invention will now be described in two embodiments exemplifying on the one hand a single jack construction, and on the other hand a two-jack construction, both for forward retraction of an aeroplane undercarriage.

Figure 1 is an illustrative drawing in side elevation showing in full line a single jack undercarriage extended, and in broken line the same parts in retracted positions;

Figure 2 is a front elevation of the undercarriage of Figure 1;

Figure 3 is a side elevation of a two-jack undercarriage; and

Figure 4 a further side elevation of the undercarriage of Figure 3.

Dealing first with Figures 1 and 2, the undercarriage comprises in effect a compression leg which is built up of two parallel telescopic and resilient parts 1 and 2, braced for example by diagonals 3 and carrying the wheel 4 on a suitable spindle at 5. For convenience this whole structure is referred to as the "leg", and to it there is pivoted at 6 a compression radius rod 7 which, although not illustrated as such, is preferably a rigid triangular structure pivotally anchored at 8 to a structural part of the aircraft wing indicated at 9. The part 9 may be a rear wing spar or the like. The upper end of the leg is pivoted at 10 to a fitting 11 mounted on a tube 12 which is the ram part of a hydraulic jack and which slides upon a fixed internal stem 13, the ram 12 also sliding within a jack cylinder 14 which is rigid with the stem 13. The forward end of the stem 13 is anchored to a part 15 which may be, or be attached to, the front wing spar or other structural component. The cylinder 14 is anchored in the part 9. The fixed part of the jack can thus be made as a substantial beam interconnecting 9 and 15, and it may therefore be a stressed part of the wing structure, for example acting as a compression rib or spar spacer. The ram 12 has a suitable annular piston working upon the stem 13 and in the cylinder 14, and subjected to the appropriate hydraulic pressures. It will be observed that the longitudinal axis of the jack as a whole is substantially at right angles to the leg 1, 2, when the latter is extended; consequently compression loads in the leg do not tend to displace the ram 12 of the jack. The leg and radius rod form virtually a triangular space frame. When the ram 12 is hydraulically moved backwards further into the cylinder 14, the undercarriage swings and retracts fowardly and upwardly towards the position indicated in broken line.

Turning now to the example of Figures 3 and 4, like parts have, as far as possible, like reference numerals, and the leg 1 is again pivoted at 10 to a ram 12 through a fitting 11 which slides on a jack stem 13. In this case however, the upper rear pivot 8 of the radius rod 7, comprises an attachment to a fitting 16 of a second hydraulic jack of exactly similar construction to that previously described. This second jack has its stem 17 anchored through the medium of a fitting 18 to the cylinder 14 of the first jack. The cylinder 19 of the second jack is anchored through the medium of a suitable fitting, to the same part 9, as the cylinder 14. The jack comprised by 16, 17, 19, is arranged, by suitable hydraulic connecting, so that, whilst during retraction the first jack moves backward, this second jack moves forward. The ram fittings 11 and 16 consequently approach one another during retraction. It will thus be seen that in both cases the pivotal anchorages of the leg and radius rod approach during retraction, and this enables a compact retracted condition to be achieved. It will also be seen that the proposed disposition of the second jack is such that in the extended undercarriage condition the fitting 16 can abut against the limit stop of the jack so that compression loads in the radius rod 7 are transmittable directly to the aircraft structure. Since the loads in the leg 1 are transmitted practically directly to the structure, and in any case the beam formed by the first jack can clearly be made very robust, and is only subjected to a small bending load by the leg, a particularly robust as well as an easily operable structure, has resulted.

What I claim is:

1. In a retractable aircraft undercarriage, a hydraulic jack carried by the aircraft and having a piston provided with a fitting, a leg pivotally anchored in the fitting for fore and aft retraction, a radius rod having one end pivotally connected to the leg at a point near the longitudinal axis of the leg, a second fitting connecting the upper end of the radius rod to the aircraft, said jack being fixedly supported at spaced points on the aircraft and including between said points the path of movement of the piston and fitting whereby the jack will be rigidly supported in all positions against loads due to radius rod compression during retraction.

2. In a retractable aircraft undercarriage, a hydraulic jack having a piston provided with a fitting, a leg having its upper end pivotally connected to the fitting, a radius rod pivotally connected to the leg at a point lying near the longitudinal axis of the leg, said radius rod having an end pivotally anchored in an aircraft, said jack being disposed fixedly supported on the aircraft at spaced points including between said points the path of movement of the fitting whereby the jack will be rigidly supported in all positions against loads due to radius rod compression or tension during retraction.

3. In a retractable aircraft undercarriage, a hydraulic jack having a moving part, a second hydraulic jack having a moving part, a leg having one end pivotally connected to the moving part of the first mentioned jack, a radius rod having an upper end pivotally connected with the moving part of the second mentioned hydraulic jack, and means connecting said jacks with an aircraft, said leg and radius rod being pivotally inter-attached at a point lying near the longitudinal axis of the leg, said jacks being supported at longitudinally spaced points and including between the longitudinally spaced points of each jack the distance of travel of each moving part whereby the jacks will be rigidly supported against loads due to radius rod compression or tension in all positions of retraction.

4. In a retractable aircraft undercarriage, a hydraulic jack mounted on an aircraft and having a piston provided with a fitting, a leg having an end pivotally anchored in the fitting for fore and aft retraction, said leg having shock absorbing means, a radius rod having one end pivotally connected to the leg at a point near the longitudinal axis of the leg at its lower end and being adapted to extend upwardly and rearwardly in extended position with its upper end connected to the fitting, said jack being fixedly supported at spaced points in the aircraft and including between said points the path of movement of the fitting whereby the jack will be rigidly supported in all positions against loads due to radius rod compression during retraction, said jack bracing the wing.

5. In a retractable aircraft undercarriage, a hydraulic jack having a piston provided with a fitting, a leg having shock absorbing means and having its upper end pivotally connected to the fitting, a radius rod pivotally connected to the leg at a point lying near the longitudinal axis of the leg, said radius rod having an end pivotally anchored in an aircraft for fore and aft retraction, and means securing the jack to an aircraft, said jack being anchored to the aircraft at spaced points and including between said points the path of movement of the fitting whereby the jack will be rigidly supported in all positions against loads due to radius rod compression or tension during retraction.

6. In a retractable aircraft undercarriage, a hydraulic jack anchored at spaced points to an aircraft and having a moving part, a second hydraulic jack on said first hydraulic jack and having a moving part, a leg having shock absorbing means and having one end pivotally connected to the moving part of the first mentioned jack, and a radius rod having an upper end pivotally connected with the moving part of the second mentioned hydraulic jack, said leg and radius rod being pivotally inter-attached at a point lying between the corresponding lower ends of said leg and near the longitudinal axis of the leg, said first mentioned jack being supported on the aircraft at longitudinally spaced points, the distance of travel of each moving part being included between the longitudinally spaced points of each jack whereby the jacks will be rigidly supported against loads due to radius rod compression or tension in all positions of retraction, the moving part of said first jack being adapted to move rearwardly and the moving part of said second mentioned jack being adapted to move forwardly for upward and forward retraction movement of the leg.

7. In a retractable aircraft undercarriage, a hydraulic jack anchored at spaced points to aircraft structure and having a moving part, a second hydraulic jack having a moving part, a leg having shock absorbing means and having one end pivotally connected to the moving part of the first mentioned jack, and a radius rod having an upper end pivotally connected with the moving part of the second mentioned hydraulic jack, said leg and radius rod being pivotally inter-attached at a point lying near their corresponding ends, said jacks being supported at longitudinally spaced points and including between the longitudinally spaced points of each jack the distance of travel of each moving part whereby the jacks will be rigidly supported against loads due to radius rod compression or tension in all positions of retraction, the moving part of said first jack being adapted to move rearwardly and the moving part of said second jack being adapted to move forwardly for upward and forward retraction movement of the leg, said second hydraulic jack being so positioned that when the undercarriage is extended, the moving part of said jack abuts one end of the travel between the points, said end defining a stop.

8. In a retractable aircraft undercarriage, a hydraulic jack anchored at spaced points to aircraft structure and having a moving part, a second hydraulic jack having a moving part, a leg having shock absorbing means and having one end pivotally connected to the moving part of the first mentioned jack, and a radius rod having an upper end pivotally connected with the moving part of the second mentioned hydraulic jack, said leg and radius rod being pivotally inter-attached at a point lying between the ends of said leg and near the longitudinal axis of the leg, said jacks being supported at longitudinally spaced points and including between the longitudinally spaced points of each jack the distance of travel of each moving part whereby the jacks will be rigidly supported against loads due to radius rod compression or tension in all positions of retraction, the moving part of said first jack being adapted to move rearwardly and the moving part of said second jack being adapted to move forwardly for upward and forward retraction movement of the leg, said jacks being operable from a common source of pressure.

9. In a retractable aircraft undercarriage, a hydraulic jack including a cylinder having an internal stem, means connecting the cylinder and stem to a structural component of an aircraft, a tube slidable on the stem and slidable within the cylinder, a fitting on the tube, a leg adapted to be mounted in extended position at substantially right angles to the cylinder and stem and having its upper end portion pivotally connected with the fitting, said leg being adapted for forward and upward retracting movement, a second jack having a stem, means connecting the second jack and stem with the first jack at an angle thereto, a fitting slidable on the stem of said second mentioned jack, and a radius rod connecting said last mentioned fitting with the lower end portion of said leg, said fittings being moved toward each other along their respective stems for effecting retraction of the undercarriage.

10. In a device of the class described, a hydraulic jack having a cylinder and a stem, means connecting said cylinder and stem to components of an aircraft, a tube slidable on the stem and adapted to be shifted within the cylinder, a fitting carried by the tube, a strut having one end pivotally connected with the fitting and being adapted to extend in extended position at substantially right angles to the cylinder and stem, a radius rod having one end connected to said first mentioned means and the other end connected to the lower end portion of said strut, and shock absorbing means carried by the strut, said radius rod and strut being shifted toward each other at movement of the fitting on the stem for effecting retraction of the undercarriage.

11. In a retractable aircraft undercarriage, a hydraulic jack including a jack cylinder having a stem, means securing the jack to an airplane structure, a tube slidable on the stem and within the jack cylinder, said tube defining a ram, a fitting carried by the ram, a compression leg having an end pivotally connected with the fitting, supporting means carried at the other end of the compression leg, and a compression radius rod having one end secured to said first mentioned means and the other end to said compression leg near the free end thereof, said ram being shiftable hydraulically on the stem between the cylinder and the fitting for retracting or lowering the leg and supporting means, said wing supporting the cylinder and stem against loads.

12. In a retractable aircraft undercarriage, a leg pivotally supported at longitudinally spaced points, a strut having an end pivotally supporting said leg at one of said points, the other end of said strut being attached to the aircraft, a hydraulic jack comprising a hydraulic cylinder with a stroke length of not more than half the length of the jack, said cylinder having a stem alined therewith and extending therefrom by a length at least equal to said stroke length, a piston about the stem and projecting from the cylinder, said stem guiding the piston, and a pivot connection between said piston and said leg, the jack so comprised being fixed to the aircraft at points spaced lengthwise so as to include between them the piston travel whereby said leg will be moved by the piston and be supported throughout its movement by the jack.

13. In a retractable aircraft undercarriage, a pair of movable members, one of said members being a leg pivotally supported at longitudinally spaced points and the other of said members being a strut having an end pivotally supporting said leg at one of said points, the other end of said strut being attached to the aircraft, a hydraulic jack comprising a hydraulic cylinder with a stroke length of not more than half the length of the jack, said hydraulic cylinder having a stem therein and projecting therefrom by a length at least equal to said stroke length, a piston slidable in the cylinder about the stem and guided by said stem, said piston having a fitting, and means pivotally connecting the fitting to the leg whereby the movement of the piston will shift the leg, said jack being fixed to the aircraft at points spaced lengthwise so as to include between them the piston travel and said jack supporting the leg throughout its movement.

14. In a retractable aircraft undercarriage, a leg pivotally supported at longitudinally spaced points, a strut having an end pivotally supporting said leg at one of said points, a hydraulic jack including a cylinder attached to the aircraft, a piston slidable in the jack, means pivotally connecting the piston with the strut, a second hydraulic jack comprising a hydraulic device attached to another portion of the aircraft and spaced from the first jack, a piston slidable in said second mentioned hydraulic cylinder, and means connecting the leg with said second mentioned piston, said jacks being so mounted on the aircraft as to include between the mounting points the piston travel of both of the pistons, said strut and said leg being movable by movement of the piston and being supported by said hydraulic jacks during movement.

GEORGE HERBERT DOWTY.